Patented Apr. 5, 1932

1,852,606

UNITED STATES PATENT OFFICE

JOSEPH FOUSEK, OF SAN FRANCISCO, CALIFORNIA

PROCESS FOR THE STERILIZATION AND PRESERVATION OF EGGS

No Drawing.  Application filed May 15, 1928. Serial No. 278,037.  REISSUED

The present invention relates to a new and useful process for sterilizing and preserving eggs for commercial purposes, and includes the preserving of the whole of broken eggs, their whites or yolks separately, or any desired proportionate mixture of whites and yolks, the product secured from thus processing eggs being of a character and put up in such form as to best meet the requirements and conveniences of the trade.

It is to be understood that throughout this specification the term "egg" applies generically to any and all eggs, but more particularly to those of the domestic fowl, and that it is also intended to apply to the whole egg as removed from the shell, or to the whites, or to the yolks, or to the whites and yolks combined in any desired proportions.

The present process for the sterilization and preservation of eggs has been developed since the issuance of my Patent No. 1,597,186, of August the 26th, 1926, and results from the experience gained in connection therewith, coupled with the research work connected with my applications for patents, Serial No. 190,654, filed May the 11th, 1927, and Patent No. 1,724,078.

It was learned from the experiments conducted in connection with the above noted processes for egg preservation that, with a properly proportioned mixture of egg, sugar and syrup, reduced to complete emulsification and subjected to a right temperature, the product thus produced became possessed of excellent keeping qualities. Additional research also disclosed that the addition of the saccharine matter coupled with the emulsification process acted directly for the immediate separation from the egg body of all membranous, protoplasmic and like constituents entering into the egg structure and that the removal of these gave a greatly improved product as to quality, together with a much extended period of preservation to this refined product when unsealed. Further investigation also developed that certain others of the carbohydrate group possessed the property of effecting this separation, as did also certain of the polyhydric alcohols, such as mannitol, glycerin and glycol, and that under treatment by any of these there resulted a product of a uniform excellency of character that, when properly sterilized and sealed in containers, became possessed of qualities enabling it to be kept without impairment indefinitely, regardless of climatic conditions.

The primary object of my invention is the sterilization and preservation of eggs without impairment as to quality, whether as a whole, as whites, as yolks, or as whites and yolks in any desired proportionate quantities.

Objects additional to the foregoing are:

To so process and preserve eggs in bulk as to fit them for substitution for fresh eggs, in the culinary arts and elsewhere, where excellency of results are required and are so greatly dependent upon the quality of the eggs used;

To so process and preserve eggs in bulk as to cause them to retain in full measure those essential physical and chemical characteristics found in the fresh egg, and to prevent that denaturalization of proteins and degeneration of the egg substance commonly known as "watering of the whites";

To so process eggs for their preservation as to destroy all bacteria without affecting the character of the physical and chemical constituents of the eggs;

To cheaply sterilize and preserve eggs without impairment, as a contributing means to the prevention of that waste in the egg industry resulting from the perishable character of eggs;

To so sterilize, preserve and seal eggs in a container as to insure keeping indefinitely and unimpaired under all climatic conditions, and as best facilitates their handling in shipping;

To supply the market with a sterilized preserved egg product, properly prepared, proportioned and standardized for immediate use and of a quality insuring uniformity of results in the arts utilizing eggs in their products;

To provide a sterilized preserved egg product adapted to meet the different requirements of the diverse arts employing eggs in their products, by varying the proportions of water, albumen, yolk, and a selected carbohydrate, or its equivalent of polyhydric alcohol, entering into the completed product;

To provide a cheapened labor-saving sterilized preserved egg product freed from all membranous and protoplasmic particles, and of a character readily assimilable by all doughs and particularly valuable in the production of the finer and more delicate bakery products, such as lady-fingers, sponges, etc.; and, finally;

To supply to the general trade, and to others, a processed egg product of superior quality and clear honey-like consistency, from which, at an earlier stage, has been removed all those elements of inferior food values and most subject to deterioration, leaving, as a refined product, those elements, only, possessed of fresh egg qualities.

As is well known, it is common practice in the art of baking, after breaking and mixing the eggs, to allow them to stand for a period of from three to five days to "ripen", this "ripening" process being of a disintegrating character causing the separation of the membranous and protoplasmic portions from the egg-body proper, the former, being the lighter, rising to the top, from whence it was removed and rejected as worthless. In my process, this step is not delayed but is of, practically, immediate accomplishment. Nor is there need of any sacrifice of removed elements as waste, since these, too, are sterilized and hermetically sealed for later use in the making of macaroons and such like delicacies.

The invention resides in the incorporation with the egg content of a variable amount of a suitable carbohydrate, or its equivalent of a polyhydric alcohol, such as glucose, fructose, saccharose or mannitol, glycerin, or glycol, these acting to separate the membranous and protoplasmic portions of the egg from its watery, albuminous and protein portions, while, at the same time, raising the coagulating temperature of the egg albumen from a matter of 140 degrees, at which the ordinary bacteria would be immune, to an approximate 170 degrees Fahrenheit, a temperature insuring the destruction of the bacteria and perfect sterilization of the product when subjected to it, without impairment of the quality of the product through partial or complete coagulation of the albumen.

The proportion of carbohydrate, or of its equivalent of a polyhydric alcohol, used may vary considerably, but most essentially must be confined within the limits affecting markedly the physical structure of the egg liquid and the heat protective action upon the colloids present in the whites and yolks of the eggs, these proportions varying, safely, by weight, from 1:1, 3:2 or 2:3, any of these ratios meeting successfully the requirements of the process.

My process for the sterilization and preservation of eggs is substantially as follows:

1. The eggs, after removal from their shells, are weighed and placed in a mechanical mixer;
2. To the eggs are now added the required proportion of a suitable carbohydrate, or its equivalent of polyhydric alcohol;
3. The composition thus secured is thoroughly mixed to a state of perfect emulsification;
4. After emulsification, the mass, now of syrupy-like consistency, is allowed to stand for a short time to permit loosening and separation of the membranous and protoplasmic portions from the watery, albuminous and protein portions;
5. Following this, comes the removal of the membranous and protoplasmic portions, by skimming, straining or centrifugal separator action;
6. The two products thus secured are now separately subjected to a germ-destroying heat for a time and immediately thereafter hermetically sealed in containers.

While the main purpose sought in the production of a refined preserved sterilized egg product, it is obvious that three distinct products may result from the process, the first containing the entire egg, the second only the refuse or membranous and protoplasmic portions, and the third or refined the albuminous and protein portions.

It is realized that others have used either sugar or glycerin in connection with egg preservation, the one used being dependent upon whether freezing or dehydration was to enter into the process; if the former, the sugar acting ordinarily to prevent reaching a temperature sufficiently low to affect the physical properties of the protein; and, if the latter, the glycerin acting to protect against deterioration of the physical and chemical properties through a too drastic dehydration.

I claim and desire to secure by Letters Patent of the United States, the following:

1. The herein described process for sterilizing and preserving eggs, which consists of introducing into a broken egg mass a carbohydrate for the purpose of causing the separation of the membranous, protoplasmic and fibrous portions of the egg structure from the remaining portions thereof emulsifying the egg and carbohydrate mixture, allowing said mixture to settle, and thereafter separating the fibrous portions therefrom.

2. The herein described process for sterilizing and preserving broken eggs which consists of adding a carbohydrate thereto in sufficient quantity to loosen the membranous, protoplasmic and fibrous structure of the egg, mixing and emulsifying thoroughly, allowing the admixture to settle, then skimming said loosened membranous, protoplasimic and fibrous structure from the remaining portions of the egg and finally straining said remaining egg liquid to clarify the same.

3. The herein described method of increasing the coagulating point of egg albumen, which consists in mixing a selected carbohydrate therewith in proportions varying from 3:2 to 2:3, by weight, and then thoroughly emulsifying the mixture allowing said mixture to settle, and then straining it.

4. The process for sterilizing and preserving eggs comprising adding to the eggs an amount of a carbohydrate sufficient to raise the point of coagulation upon application of heat, emulsifying the resulting product, permitting the emulsified mass to stand until the membranous and protoplasmic portion is separated out, removing said membranous and protoplasmic portion, heating the remaining portion to destroy the contained germs.

5. The process of preserving eggs comprising adding thereto an amount of a carbohydrate sufficient to raise the point of coagulation when heat is applied, emulsifying the resulting product, permitting the emulsified mass to stand until the membranous and protoplasmic portion is separated out, heating the membranous and protoplasmic portion to destroy the contained germs.

In testimony whereof, I hereby affix my signature this 9th day of May, 1928.

JOSEPH FOUSEK.